United States Patent
Batni et al.

(10) Patent No.: US 7,844,044 B2
(45) Date of Patent: Nov. 30, 2010

(54) CONTROL SERVER EMPLOYMENT OF OFFER MESSAGE FROM RESOURCE SERVER TO DETERMINE WHETHER TO ADD INDICATION OF THE RESOURCE SERVER TO RESOURCE SERVER MAPPING TABLE

(75) Inventors: Ramachendra P. Batni, Phoenix, AZ (US); Hai Bin Luo, Beijing (CN); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1298 days.

(21) Appl. No.: 11/173,966

(22) Filed: Jun. 30, 2005

(65) Prior Publication Data

US 2007/0005747 A1    Jan. 4, 2007

(51) Int. Cl.
*H04M 3/00* (2006.01)
*H04M 5/00* (2006.01)

(52) U.S. Cl. .................. 379/257; 379/219; 709/223

(58) Field of Classification Search .................. 379/257, 379/219; 709/223
See application file for complete search history.

(56) References Cited

U.S. PATENT DOCUMENTS

| | | | |
|---|---|---|---|
| 6,381,321 B1 * | 4/2002 | Brown et al. ............ | 379/207.02 |
| 6,747,957 B1 * | 6/2004 | Pithawala et al. .......... | 370/252 |
| 6,826,176 B1 * | 11/2004 | Siddiqui et al. ............. | 370/352 |
| 7,260,612 B2 * | 8/2007 | Inagaki ...................... | 709/213 |
| 7,376,697 B2 * | 5/2008 | Koskimies ................. | 709/203 |
| 7,415,551 B2 * | 8/2008 | Pescatore .................... | 710/62 |
| 2005/0105706 A1 * | 5/2005 | Kokkinen .............. | 379/201.01 |

* cited by examiner

*Primary Examiner*—Quynh H Nguyen
(74) *Attorney, Agent, or Firm*—Carmen Patti Law Group, LLC (57) ABSTRACT

A control server of an apparatus in one example receives an offer message from a resource server. The offer message indicates an availability of the resource server to handle one or more tasks for the control server. The control server employs the offer message to determine whether to add an indication of the resource server to a resource server mapping table that comprises indications of a plurality of available resource servers. The resource server mapping table is employable to determine a selected resource server of the plurality of available resource servers to use for a task of the one or more tasks.

22 Claims, 3 Drawing Sheets

CONTROL SERVER EMPLOYMENT OF OFFER MESSAGE FROM RESOURCE SERVER TO DETERMINE WHETHER TO ADD INDICATION OF THE RESOURCE SERVER TO RESOURCE SERVER MAPPING TABLE

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"FEEDBACK TO CALLING COMMUNICATION DEVICE ON CALL CONNECTED WITH INTELLIGENT NETWORK SIGNALING," by Ramachendra P. Batni, Robert Brunetti, John B. Reid, Laura Scruggs Reizner, and Michael Joseph Rudolph, application Ser. No. 10/683,969, filed Oct. 10, 2003.

"SCHEDULED DETERMINATION OF NETWORK RESOURCE AVAILABILITY," by Ramachendra P. Batni, Chen Fan, Ranjan Sharma, and Yu Jun Zhu, application Ser. No. 10/954,573, filed Sep. 30, 2004.

TECHNICAL FIELD

The invention relates generally to communications and more particularly to discovery and registration of new resource servers added to a network.

BACKGROUND

Known control servers employ resource servers to handle various tasks. For example, a control server (e.g., a ringback tone call controller) may route a call that requires a specialized ringback tone to a resource server (e.g., a ringback tone server) to play the specialized ringback tone to a calling party on the call. A control server employs a resource server mapping table that comprises a plurality of indications of a plurality of resource servers in a network. The control server employs the resource server mapping table to select specific resource servers to handle specific tasks. Upon receipt of a task to be handled by one of the plurality of resource servers, the control server accesses the resource server mapping table to determine which of the plurality of resource servers to assign the task.

Known resource server mapping tables are manually updated by a technician when new resource servers are added to the network. The technician determines which control servers in the network will employ the new resource server. Then, the technician adds an indication of the resource server at appropriate places in the resource server mapping tables associated with each of the control servers that will employ the resource server. As one shortcoming, the process of manually updating the resource server mapping tables is time consuming and may not be available at all times. As another shortcoming, the process of manually updating the resource server mapping tables in large networks may be unreliable. Manually updating the resource server mapping tables tends to be error-prone and may require extensive troubleshooting. As yet another shortcoming, the technician may not add the indication of the new resource server to all appropriate resource server mapping tables. For example, the technician may not timely discover the control servers that were out of service at the time the new resource server was added to the network.

Thus, a need exists for an automatic discovery and registration process between a resource server that has been added to a network and a control server in the network.

SUMMARY

When a resource server is added to a network, the newly added resource server broadcasts an offer message over the network. The offer message indicates an availability of the resource server to handle tasks for control servers in the network. The offer message invites a control server to respond with a message of intent to initiate configuration dialog between the resource server and the control server. If the control server has an interest in using the resource server for future tasks, the control server sends the message of intent to initiate the process of adding the resource server to a resource server mapping table. The control server employs the resource server mapping table to select resource servers to handle specific tasks for the control server.

In one embodiment, there is provided an apparatus comprising a control server that receives an offer message from a resource server. The offer message indicates an availability of the resource server to handle one or more tasks for the control server. The control server employs the offer message to determine whether to add an indication of the resource server to a resource server mapping table that comprises indications of a plurality of available resource servers. The resource server mapping table is employable to determine a selected resource server of the plurality of available resource servers to use for a task of the one or more tasks.

In another embodiment, there is provided an apparatus comprising a resource server that broadcasts an offer message over a network that comprises a control server. The offer message indicates an availability of the resource server to handle one or more tasks for the control server. The offer message invites the control server to add an indication of the resource server to a resource server mapping table that comprises indications of a plurality of available resource servers. The resource server mapping table is employable to determine a selected resource server of the plurality of available resource servers to use for a task of the one or more tasks.

In yet another embodiment, there is provided a method for: receiving an offer message broadcast over a network by a ringback tone server; and employing information from the offer message to add an indication of the ringback tone server to a ringback tone server mapping table that comprises indications of a plurality of available ringback tone servers. The offer message indicates an availability of the ringback tone server to play specialized ringback tones to calling communication devices on calls that require ringback tone service. The resource server mapping table is employable to determine a selected ringback tone server of the plurality of available ringback tone servers to handle a call that requires the ringback tone service.

DESCRIPTION OF THE DRAWINGS

Features of exemplary implementations of the invention will become apparent from the description, the claims, and the accompanying drawings in which:

DETAILED DESCRIPTION

Figure 1:
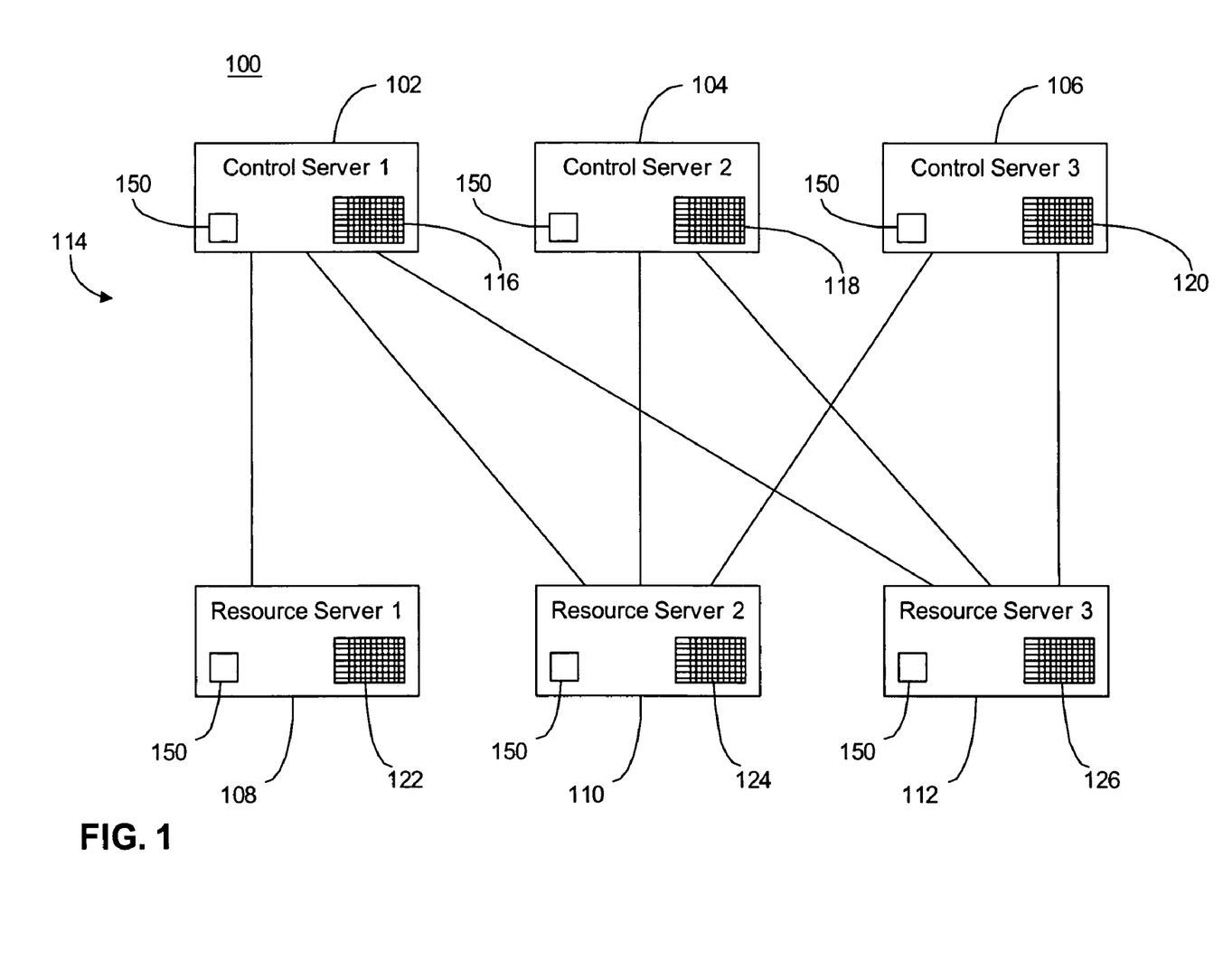
FIG. 1 is a representation of one implementation of an apparatus that comprises one or more control servers and one or more resource servers.

Turning to FIG. 1, an apparatus 100 in one example comprises one or more control servers 102, 104, and 106 and one or more resource servers 108, 110, and 112. The control servers 102, 104, and 106 and the resource servers 108, 110, and 112 comprise nodes of a network 114. The network 114 in one example comprises one or more other nodes, such as additional control servers or additional resource servers. A local area network ("LAN"), a wide area network ("WAN"), a telephone network, the Internet, a wireless network, or a Transmission Control Protocol/Internet Protocol ("TCP/IP") network in one example communicatively couples the nodes of the network 114.

The control servers 102, 104, and 106 assign tasks to the resource servers 108, 110, and 112. The control servers 102, 104, and 106 in one example receive tasks to be completed by resource servers, and then select available resource servers to handle the tasks. The control server 102 in one example employs the resource servers 108, 110, and 112 as a pool of resource servers available for selection to handle the tasks. Upon receipt of a task, the control server 102 selects one of the resource servers 108, 110, and 112 to handle the task. The control servers 102, 104, and 106 and the resource servers 108, 110, and 112 comprise instances of a recordable data storage medium 150, as described herein.

The control servers 102, 104, and 106 comprise one or more resource server mapping tables 116, 118, and 120. For example, the control server 102 stores the resource server mapping table 116, the control server 104 stores the resource server mapping table 118, and the control server 106 stores the resource server mapping table 120. The control servers 102, 104, and 106 employ the resource server mapping tables 116, 118, and 120, respectively, to select a resource server to handle a task for the control servers 102, 104, and 106. The resource server mapping tables 116, 118, and 120 may be stored in the recordable data storage medium 150 or another storage component.

The resource server mapping table 116 comprises indications of the resource servers that are available to handle tasks for the control server 102. The resource server mapping table 118 comprises indications of the resource servers that are available to handle tasks for the control server 104. The resource server mapping table 120 comprises indications of the resource servers that are available to handle tasks for the control server 106. When a new resource server is added to the network 114 that the control server 102 will use for subsequent tasks, the control server 102 and the new resource server go through an automatic discovery and registration process to add an indication of the new resource server to the resource server mapping table 116, as described herein.

The resource server mapping table 116 in one example comprises indications of the resource server 108, the resource server 110, and the resource server 112 for a given task. Therefore, the control server 102 can employ any of the resource servers 108, 110, and 112 for the task. The resource server mapping table 118 in one example comprises indications of the resource server 110 and the resource server 112 for the task. Therefore, the control server 104 can employ either of the resource servers 110 and 112 for the task. The resource server mapping table 120 in one example comprises indications of the resource server 110 and the resource server 112 for the task. Therefore, the control server 106 can employ either of the resource servers 110 and 112 for the task.

The resource server mapping table 120 in one example organizes the indications of resource servers according to the tasks the resource servers are able to handle. For example, the resource server mapping table 120 may comprise a first row for a first task that contains indications of both the resource server 110 and the resource server 112. The resource server mapping table 120 may also comprise a second row for a second task that contains only the resource server 112.

The control servers 102, 104, and 106 may organize the indications of the resource servers 108, 110, and 112 in the resource server mapping tables 116, 118, and 120 according to a relative usage preference order between the resource servers 108, 110, and 112 for specific tasks. For example, the control server 102 may assign a first priority level to the resource server 112 for a specific task, a second priority level to the resource server 108 for the task, and a third priority level to the resource server 110 for the task. Upon a need for a resource server to accomplish the task, the control server 102 accesses the resource server mapping table 116. According to the relative usage preference order stored in the resource server mapping table 116, the control server 102 will first attempt to use the resource server 112 for the task. If the resource server 112 is out of service or overloaded, then the control server will continue down the relative usage preference order and try one of the resource servers 108 and 110.

The relative usage preference order in one example is based on relative performance characteristics of the resource servers 108, 110, and 112. For example, the relative usage preference order may be based on load capacities of the resource servers 108, 110, and 112. As another example, the relative usage preference order may be based on the distance of the resource servers 108, 110, and 112 to some reference point in the network 114. If the resource server 110 is located in New York and the resource server 112 is located in Los Angeles, then for tasks that occur in New York the relative usage preference order would have resource server 110 ahead of the resource server 112. For tasks that occur in Los Angeles the relative usage preference order would have resource server 112 ahead of the resource server 110. As another example, the relative usage preference order may be based on the cost involved in having a task processed by a given resource server compared to another resource server. The control servers can establish the relative usage preference orders based on the above-listed factors singularly or in combination with other factors.

The resource servers 108, 110, and 112 comprise one or more control server mapping tables 122, 124, and 126. For example, the resource server 108 stores the control server mapping table 122, the resource server 110 stores the control server mapping table 124, and the resource server 112 stores the control server mapping table 126. The control server mapping table 122 specifies which control servers include an indication of the resource server 108 in their resource server mapping tables. Because the resource server mapping table 116 includes an indication of the resource server 108, the control server mapping table 122 comprises an indication of the control server 102. Because each of the resource server mapping tables 116, 118, and 120 include an indication of the resource server 110, the control server mapping table 124 comprises indications of each of the control servers 102, 104, and 106. The control server mapping tables 122, 124, and 126 may be stored in the recordable data storage medium 150 or another storage component.

The resource servers 108, 110, and 112 in one example send heartbeat messages to each of the control servers included in their respective control server mapping tables 122, 124, and 126. For example, the resource server 112 sends heartbeat messages to each of the control servers 102, 104, and 106. The heartbeat messages indicate a continued availability of the resource server 112 to handle tasks for the control servers 102, 104, and 106. The heartbeat messages from the resource servers 108, 110, and 112 may also include other supplementary information, such as the load the resource server that sent the heartbeat message is handling for each task the resource server can handle, the tasks the resource server is unable to continue handling (e.g., the resource server may be partially out of service), and new tasks the resource server can handle (e.g., the resource server may have been upgraded with new capabilities). This supplementary information is used by the control servers 102, 104, and 106 to update their respective control server mapping tables 122, 124, and 126.

Figure 2:
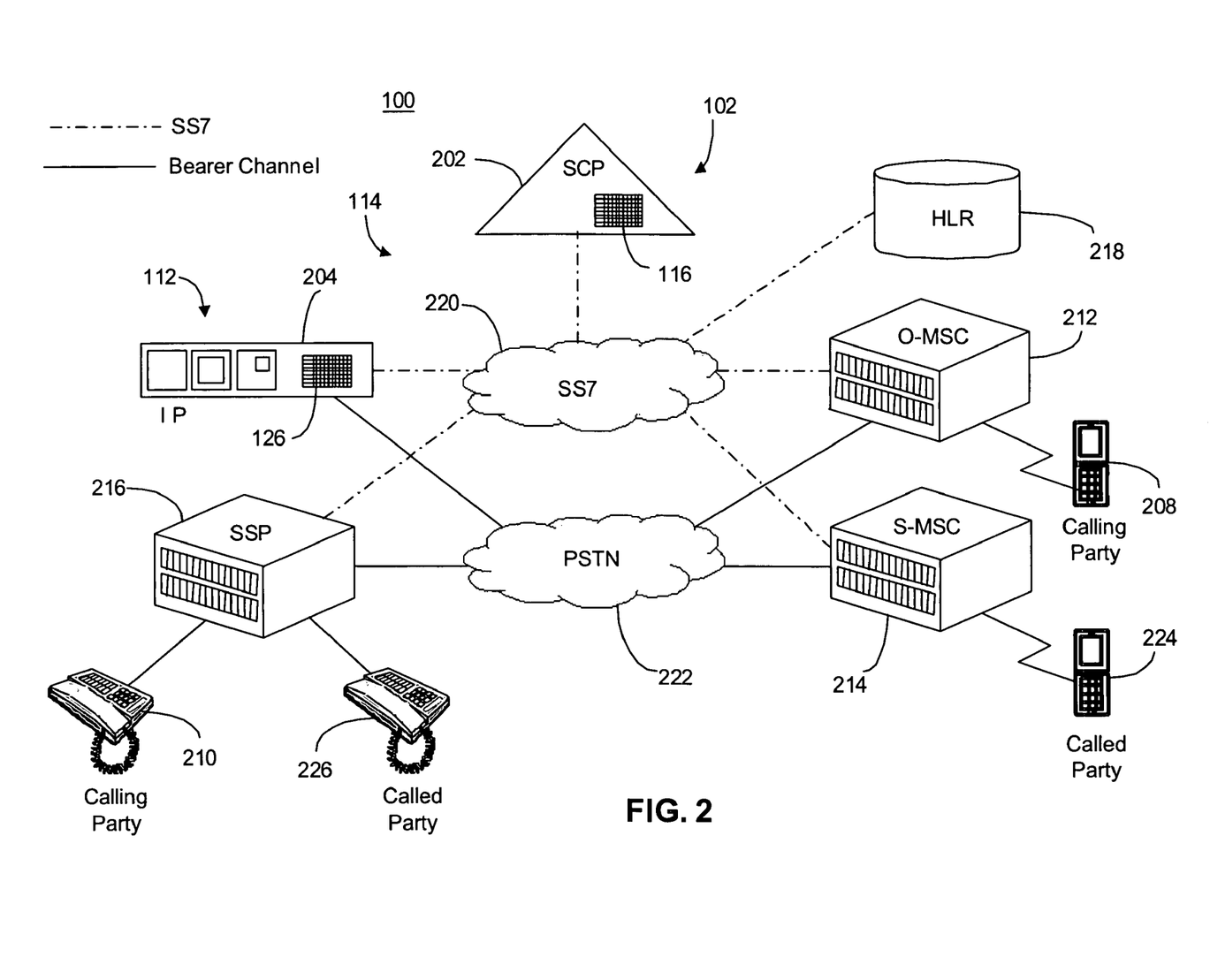
FIG. 2 is a representation of one exemplary embodiment where a control server of the one or more control servers of the apparatus of FIG. 1 comprises a ringback tone call controller, and a resource server of the one or more resource servers of the apparatus of FIG. 1 comprises a ringback tone server.

Turning to FIGS. 1-2, one embodiment is described herein where the control server 102 comprises a ringback tone call controller 202 and the resource server 112 comprises a ringback tone server 204. For example, the ringback tone call controller 202 and the ringback tone server 204 comprise a ringback tone system that provides specialized ringback tones to calling parties 208 and 210. In one example, the ringback tone call controller 202 comprises a service control point ("SCP") and the ringback tone server 204 comprises an intelligent peripheral ("IP"). The apparatus 100 in the ringback tone system embodiment comprises the ringback tone call controller 202, the ringback tone server 204, one or more mobile switching centers ("MSCs") 212 and 214, one or more service switching points ("SSPs") 216, and a home location register ("HLR") 218.

A signaling network 220 communicatively couples the ringback tone call controller 202, the ringback tone server 204, the MSCs 212 and 214, the SSP 216, and the HLR 218. The signaling network 122 in one example comprises a signaling system 7 ("SS7") network that supports signaling traffic. A bearer network 222 communicatively couples the ringback tone server 204, the MSCs 212 and 214, and the SSP 216. The bearer network 124 in one example comprises a public switched telephone network ("PSTN") that supports bearer traffic. The MSCs 212 and 214 in one example support wireless communication devices, such as the calling party 208 and a called party 224. The SSP 216 in one example supports wire-line communication devices, such as the calling party 210 and a called party 226. The specialized ringback tone service is available for both wireless and wire-line communication devices.

The called party 224 in one example subscribes to the specialized ringback tone service. The called party 224 may select specialized ringback tones to be played to calling parties on calls to the called party 224. The called party 224 in one example has activated the ringback tone service and preselected a specialized ringback tone for the specialized ringback tone service to play to the calling party 208 on calls from the calling party 208 to the called party 224.

Upon receipt of a call for the called party 224 from the calling party 208, the MSC 212 processes the call and determines that the call may require a specialized ringback tone. For example, while processing the incoming call from the calling party 208 to the called party 224, the MSC 106 encounters an Advanced Termination trigger and determines from the Trigger Address List parameter to send an Analyzed Information operation message to the ringback tone call controller 202.

The ringback tone call controller 202 accesses a ringback tone subscriber profile of the called party 224 to determine which specialized ringback tone to provide to the calling party 208 on the call. The ringback tone call controller 202 also accesses the resource server mapping table 116 to determine which ringback tone server of a plurality of available ringback tone servers to assign the task of playing the specialized ringback tone to the calling party 208 on the call. Based on information in the resource server mapping table 116, the ringback tone call controller 202 in one example selects the ringback tone server 204 to play the specialized ringback tone to the calling party 208. Therefore, the ringback tone call controller 202 routes the call to the ringback tone server 204.

To route the incoming call to the ringback tone server 204, the ringback tone call controller 202 in one example sets a TerminationList parameter of a WIN signaling message to a directory number of the ringback tone server 204. Then, the ringback tone call controller 202 sends the TerminationList parameter in the WIN signaling message to the MSC 212 that queried the ringback tone call controller 202 on what action to take for the incoming call. Upon receipt of the WIN signaling message, the MSC 212 connects the call to the ringback tone server 204. The ringback tone server 204 plays the specialized ringback tone to the calling party 208.

Figure 3:
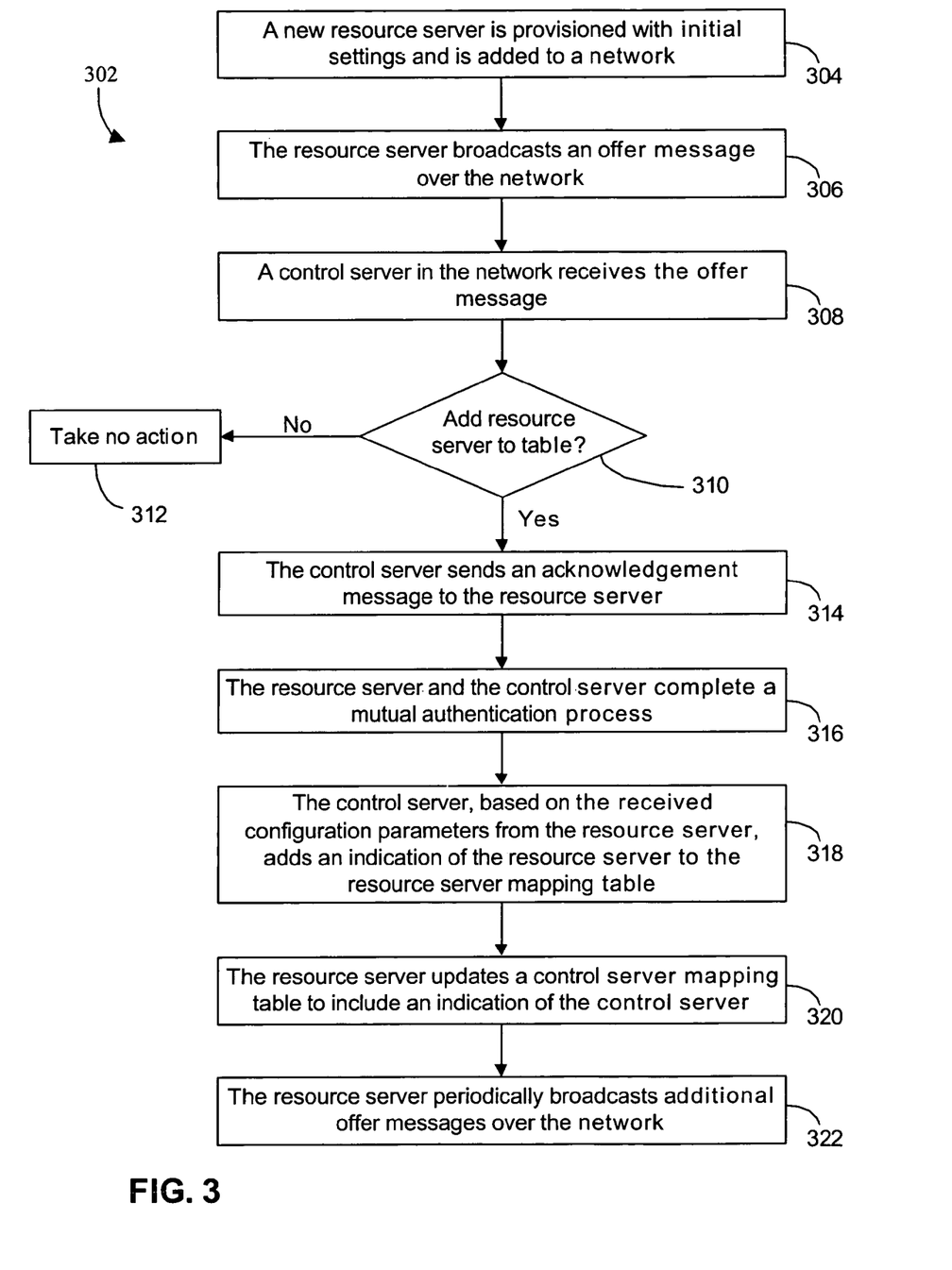
FIG. 3 is a representation of one exemplary logic flow that illustrates an automatic discovery and registration process between a newly added one of the resource servers of the apparatus of FIG. 1 and one of the control servers of the apparatus of FIG. 1.

Turning to FIGS. 1-3, an illustrative description of one exemplary operation of the apparatus 100 is presented, for explanatory purposes. Exemplary logic 302 serves to illustrate an automatic discovery and registration process between a newly added one of the resource servers 108, 110, and 112 and one of the control servers 102, 104, and 106. The newly added one of the resource servers 108, 110, and 112 in one example comprises the ringback tone server 204 (FIG. 2). The one of the control servers 102, 104, and 106 that goes through the discovery and registration process with the ringback tone server 204 in one example comprises the ringback tone call controller 202 (FIG. 2). For example, the description of the logic 302 illustrates an addition of a new ringback tone server to a ringback tone system. The logic 302 employs one or more steps, for example, STEPS 304, 306, 308, 310, 312, 314, 316, 318, 320, and 322.

At STEP 304, a new resource server is provisioned with initial settings and added to the network 114. The new resource server in one example comprises the ringback tone server 204. For example, the ringback tone server 204 is provisioned with initial settings and added to the network 114. As a first part of the initial settings, the ringback tone server 204 is provisioned with a network identification (e.g., an Internet Protocol sub-network) that indicates the scope of the network that the ringback tone server 204 is joining. As a second part of the initial settings, the ringback tone server 204 is provisioned with one or more switch identifications. The switch identifications indicate which switching centers the ringback tone server 204 is assigned to serve. For example, the ringback tone server 204 may be assigned to provide specialized ringback tones for calls received at the MSC 212. As a third part of the initial settings, the ringback tone server 204 is provisioned with an encryption scheme used in the network 114 and a symmetric key for the encryption scheme. As a fourth part of the initial settings, the ringback tone server 204 is provisioned with a range of supported frequencies for a heartbeat timer. In one example, the heartbeat timer frequency is set at initial provisioning. In another example, the heartbeat timer frequency is negotiated between the ringback tone server 204 and the control servers. The heartbeat timer indicates a frequency at which to send heartbeat messages to the control servers (e.g., the ringback tone call controller 202) that employ the ringback tone server 204. The heartbeat messages indicate a continued availability of the ringback tone server 204 to serve the control servers that employ the ringback tone server 204. As a fifth part of the initial settings, the ringback tone server 204 is provisioned with a unique identification and an Internet Protocol address. As a sixth part of the initial settings, the ringback tone server 204 is provisioned with a call handling capacity, various overload states, and related parameters. As a seventh part of the initial settings, the ringback tone server 204 is provisioned with at type of service parameter. As an eighth part of the initial settings, the ringback tone server 204 is provisioned with the various tasks (and related parameters) that the ringback tone server 204 can handle, such as the ability to play ringback tones and the ability to monitor the bearer path for any inputs (voice or DTMF) from the calling party.

After the ringback tone server 204 has been provisioned with the initial settings and been added to the network 114, STEP 304 proceeds to STEP 306. At STEP 306, the ringback tone server 204 broadcasts an offer message over the network specified in the initial settings. The network specified in the initial settings in one example comprises the network 114. The ringback tone server 204 broadcasts the offer message to a plurality of nodes in the network 114 to announce the addition of the ringback tone server 204 to the network 114. The offer message in one example comprises a gratuitous offer message. For example, the ringback tone server 204 broadcasts the offer message without receipt of a request from another node in the network 114 to send the offer message. The ringback tone server 204 automatically broadcasts the offer message over the network 114 once the ringback tone server 204 is added to the network 114.

The offer message indicates an availability of the ringback tone server 204 to handle one or more tasks for the control servers of the network 114. For example, the offer message indicates an availability of the ringback tone server 204 to play specialized ringback tones to calling communication devices that place calls to called communication devices that subscribe to the ringback tone service. The offer message indicates one or more task handling abilities and one or more performance characteristics of the ringback tone server 204. For example, the offer message indicates the ability of the ringback tone server 204 to play specialized ringback tones. The offer message also comprises an indication of a load capacity of the ringback tone server 204 and one or more switching centers to which the ringback tone server 204 provides ringback tone service. After the ringback tone server 204 broadcasts the offer message, STEP 306 proceeds to STEP 308.

At STEP 308, the offer message is received at a plurality of nodes in the network 114. For example, the control servers 102, 104, and 106 that are in service at the time of the offer message will receive the offer message. The control server 102 in one example comprises the ringback tone call controller 202 (FIG. 2). The ringback tone call controller 202 receives the offer message that indicates the availability of the ringback tone server 204 to play specialized ringback tones on calls that require the ringback tone service. After the ringback tone call controller 202 receives the offer message, STEP 308 proceeds to STEP 310.

At STEP 310, the ringback tone call controller 202 employs the offer message to determine whether to add an indication of the ringback tone server 204 to the resource server mapping table 116. For example, the ringback tone call controller 202 determines if there is a need to add this type of ringback tone server to the resource server mapping table 116. In one example, the ringback tone call controller 202 may want to add the ringback tone server 204 to the resource server mapping table 116 because the ringback tone server 204 is a type needed by the ringback tone call controller 202. In another example, the ringback tone call controller 202 may want to add the ringback tone server 204 to the resource server mapping table 116 because the other ringback tone servers that handle calls for the ringback tone call controller 202 may be overloaded or have a high current load state. In yet another example, the ringback tone call controller 202 determines whether to add the indication of the ringback tone server 204 by looking at the performance characteristics of the ringback tone server 204 and the list of supported switching centers.

The resource server mapping table 116 in one example comprises indications of a plurality of available ringback tone servers. If the ringback tone call controller 202 wants the ability to use the ringback tone server 204 for subsequent ringback tone service calls, then the ringback tone call controller 202 will decide to add the indication of the ringback tone server 204 to the resource server mapping table 116. For example, if some of the existing ringback tone servers in the resource server mapping table 116 are out of service or overloaded, then the ringback tone call controller 202 may want to add the indication of the ringback tone server 204 to the resource server mapping table 116.

If the ringback tone call controller 202 does not find a need to use the ringback tone server 204 for subsequent ringback tone service calls, then STEP 310 proceeds to STEP 312, and the ringback tone call controller 202 takes no action. Although the tone call controller 202 may not respond to the offer message from the ringback tone server 204 at this time, the ringback tone call controller 202 may find a need to use the ringback tone server 204 at a later time and can then respond to a subsequent offer message from the ringback tone server 204. If the ringback tone call controller 202 wants the ability to use the ringback tone server 204 for subsequent ringback tone service calls, then STEP 310 proceeds to STEP 314.

In one example, the offer message contains all the required configuration parameters to add an indication of the ringback tone server 204 to a resource server mapping table. The control servers interested in adding an indication of the ringback tone server 204 to a resource server mapping table need not send a message of intent to the ringback tone server 204. If control servers want to set up a heartbeat message system with the ringback tone server 204, then the controls servers can respond to offer message with a message of intent so the ringback tone server 204 can add an indication of the control servers to the control server mapping table 126, as described herein.

In another example, the offer message invites any of the control server servers 102, 104, and 106 to respond with a message of intent to initiate configuration between the ringback tone server 204 and the responding ones of the control server servers 102, 104, and 106. At STEP 314, the ringback tone call controller 202 sends the message of intent to the ringback tone server 204 to initiate configuration between the ringback tone server 204 and the ringback tone call controller 202. In one example, the message of intent comprises a point-to-point message from the ringback tone call controller 202 to the ringback tone server 204. In another example, the message of intent comprises a broadcast message of intent from the ringback tone call controller 202. When the message of intent is broadcast, other call controller platforms wait for the dialog between the ringback tone call controller 202 and the ringback tone server 204 to finish before establishing contact with the ringback tone server 204. After the ringback tone server 204 receives the message of intent, STEP 314 proceeds to STEP 316.

At STEP 316, the ringback tone call controller 202 and the ringback tone server 204 complete a mutual authentication process. The ringback tone call controller 202 exchanges authentication messages with the ringback tone server 204 to confirm an identity of the ringback tone server 204. The ringback tone server 204 exchanges authentication messages with the ringback tone call controller 202 to confirm an identity of the ringback tone call controller 202. The ringback tone call controller 202 and the ringback tone server 204 in one example authenticate each other through a challenge-response mechanism. For example, the ringback tone call controller 202 and the ringback tone server 204 may employ a symmetric key and a one way hashing algorithm, such as Message Digest 5 ("MD5"), Data Encryption Standard ("DES"), Rivest-Shamir-Adleman ("RSA"), Secure Hash Algorithm ("SHA"), or the like. After the ringback tone call controller 202 and the ringback tone server 204 complete the mutual authentication process, STEP 316 proceeds to STEP 318.

At STEP 318, the ringback tone call controller 202 and the ringback tone server 204 exchange configuration parameters and the ringback tone call controller 202 adds the indication of the ringback tone server 204 to the resource server mapping table 116. The configuration parameters in one example server to negotiate the heartbeat timer frequency between the ringback tone call controller 202 and the ringback tone server 204. The heartbeat timer indicates a frequency for the ringback tone server 204 to send heartbeat messages to the ringback tone call controller 202. The configuration parameters may also indicate a frequency at which the ringback tone call controller 202 determines the availability status of the ringback tone server 204 based on whether the ringback tone call controller 202 has received a heartbeat message from the ringback tone server 204.

The resource server mapping table 116 in one example comprises one or more entries that correspond to one or more respective switching centers. For example, the resource server mapping table 116 comprises a list of one or more available ringback tone servers for each switching center. The ringback tone call controller 202 adds the indication of the ringback tone server 204 to an entry in the resource server mapping table 116 that corresponds to the switching center to which the ringback tone server 204 provides ringback tone service. In one example, the ringback tone server 204 provides ringback tone service to the MSC 212. Therefore, the ringback tone call controller 202 adds the indication of the ringback tone server 204 to the entry in the resource server mapping table 116 that corresponds to the MSC 212.

The ringback tone call controller 202 in one example employs the performance characteristics of the ringback tone server 204 to set a relative usage preference order between the ringback tone server 204 and one or more other ringback tone servers that are listed in the entry for the MSC 212. For example, the ringback tone call controller 202 may list the ringback tone server 204 as the highest priority for a given switching center if the ringback tone call controller 202 has the highest load capacity of the ringback tone servers that handle calls for that switching center. Alternatively, the ringback tone call controller 202 may list the ringback tone server 204 as a lower priority to serve as a backup for existing ringback tone servers.

At STEP 320, the ringback tone server 204 updates the control server mapping table 126 to include an indication of the ringback tone call controller 202. The control server mapping table 126 specifies which control servers include an indication of the ringback tone call controller 202 in their resource server mapping tables. The ringback tone server 204 sends heartbeat messages to the control servers included in the control server mapping table 126. The heartbeat messages indicate a continued availability of the resource server to serve the control servers that employ the ringback tone server 204. After the ringback tone server 204 adds the indication of the ringback tone call controller 202 to the control server mapping table 126, the ringback tone server 204 will send the periodic heartbeat messages to the ringback tone call controller 202.

After configuration is complete between the ringback tone call controller 202 and the ringback tone server 204, the ringback tone call controller 202 can now route calls to the ringback tone server 204 to play specialized ringback tones to calling communication devices, and STEP 320 proceeds to STEP 322. At STEP 322, the ringback tone server 204 periodically broadcasts additional offer messages over the network 114. The ringback tone server 204 in one example broadcasts the additional offer messages at a low frequency. The additional offer messages serve to advertise the availability of the ringback tone server 204 to any control servers that may have been out of service when the ringback tone server 204 broadcast the first offer message over the network 114. The additional offer messages also serve to advertise the continued availability of the ringback tone server 204 to any control servers that did not respond to the first offer message. The control servers may consider adding the ringback tone server 204 at a time after the first offer message was sent by responding to the additional offer messages. For example, the control servers may want to add the ringback tone server 204 because of increased call load, diminished resource server capacity, or both.

The control server 104 in one example was out of service when the ringback tone server 204 broadcast the first offer message, and the control server 104 has since become in service after the ringback tone server 204 broadcast the first offer message. After becoming in service, the control server 104 will monitor the network 114 for broadcast offer messages from ringback tone servers that were added to the network 114 while the control server 104 was out of service. While monitoring the network, the control server 104 will receive the next periodic additional offer message from the ringback tone server 204 and decide whether to add an indication of the ringback tone server 204 to its resource server mapping table 118, as analogously described above for the configuration between the ringback tone server 204 and the control server 102 (i.e., the ringback tone call controller 202).

In one example, the additional offer messages are identical to the first offer message sent when the ringback tone server 204 was added to the network 114. In another example, one or more parameters of the additional offer messages have been changed relative to the first offer message. For example, the first offer message may advertise a first load capacity and the second offer message may advertise a second load capacity that is lower than the first load capacity. The ringback tone server 204 may reduce the advertised load capacity due to an increase in load at the ringback tone server 204 between sending the first offer message and sending the additional offer messages. In another example, the ringback tone server 204 may reduce the advertised load capacity due to diminished capacity of the ringback tone server 204, such as due to a failure in one or more subcomponents of the ringback tone server 204.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the control servers 102, 104, and 106 and the resource servers 108, 110, and 112. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a control server that receives an offer message from a resource server, wherein the offer message indicates an availability of the resource server to handle one or more tasks for the control server;
   wherein the control server employs the offer message to determine whether to add an indication of the resource server to a resource server mapping table that comprises indications of a plurality of available resource servers, wherein the resource server mapping table is employable to determine a selected resource server of the plurality of available resource servers to use for a task of the one or more tasks,
   wherein the resource server broadcasts the offer message to a plurality of nodes in a network, and where the offer message announces that the resource server has been added to the network, and
   wherein the control server selectively determined whether to automatically, and dynamically update the resource server mapping table based on the offer message it receives.

2. The apparatus of claim 1, wherein the resource server broadcasts the offer message to a plurality of nodes in a network, wherein the offer message announces that the resource server has been added to the network.

3. The apparatus of claim 1, wherein the control server evaluates load conditions of other resource servers to determine whether to add the indication of the resource server to the resource server mapping table.

4. The apparatus of claim 1, wherein the offer message indicates one or more task handling abilities and one or more characteristics of the resource server;
   wherein the control server employs the one or more task handling abilities and the one or more characteristics of the resource server to determine if there is a desire to potentially use the resource server for one or more of the one or more tasks;
   wherein if the control server has the desire to potentially use the resource server, the control server sends a message of intent back to the resource server in response to the offer message.

5. The apparatus of claim 4, wherein after the control server sends the message of intent, the control server exchanges authentication messages with the resource server to confirm an identity of the resource server and the resource server exchanges authentication messages with the control server to confirm an identity of the control server.

6. The apparatus of claim 5, wherein if the control server successfully confirms the identity of the resource server and the resource server successfully confirms the identity of the control server, the control server receives configuration parameters from the resource server and adds the indication of the resource server to the resource server mapping table to allow the control server to use the resource server for one or more of the one or more tasks.

7. The apparatus of claim 1 in combination with the resource server, wherein the resource server comprises a heartbeat timer that indicates a frequency at which to send heartbeat messages to one or more control servers that employ the resource server, wherein the heartbeat messages indicate a continued availability of the resource server to serve the one or more control servers that employ the resource server;
   wherein if the control server adds the indication of the resource server to the resource server mapping table, then the resource server adds an indication of the control server to a control server mapping table that specifies which control servers to send the heartbeat messages.

8. The apparatus of claim 1, wherein the control server comprises a ringback tone call controller, wherein the resource server comprises a ringback tone server,
   wherein if the ringback tone server comprises the selected resource server to handle a call that requires a specialized ringback tone, the ringback tone call controller routes the call to the ringback tone server and the ringback tone server plays the specialized ringback tone to a calling communication device on the call.

9. The apparatus of claim 1, wherein the control server comprises a ringback tone call controller, wherein the resource server comprises a ringback tone server;
   wherein the offer message indicates a switching center to which the ringback tone server provides ringback tone service;
   wherein the resource server mapping table comprises one or more entries that correspond to one or more respective switching centers, wherein each of the one or more entries comprise indications of one or more ringback tone servers that serve the one or more respective switching centers;
    wherein to add the indication of the ringback tone server to the resource server mapping table, the ringback tone call controller adds the indication of the ringback tone server to an entry of the one or more entries that corresponds to the switching center to which the ringback tone server provides ringback tone service.

10. The apparatus of claim 9, wherein the offer message indicates one or more characteristics of the ringback tone server;
    wherein the ringback tone call controller employs the one or more characteristics to set a relative usage preference order in the resource server mapping table between the ringback tone server and one or more other ringback tone servers that serve the switching center.

11. An apparatus, comprising:
a control server that receives an offer message from a resource server, wherein the offer message indicates an availability of the resource server to handle one or more tasks for the control server;
    wherein the control server employs the offer message to selectively determine whether to automatically add an indication of the resource server to a dynamic resource server mapping table that comprises indications of a plurality of available resource servers, wherein the dynamic resource server mapping table is employable to determine a selected resource server of the plurality of available resource servers to use for a task of the one or more tasks, wherein, in combination with the resource server, the offer message comprises a first offer message, the control server comprises a first control server in a network, and the dynamic resource server mapping table comprises a first dynamic resource server mapping table;
the apparatus further comprising a second control server in the network, wherein the second control server comprises a second dynamic resource server mapping table;
wherein the second control server was out of service when the resource server broadcast the first offer message over the network, wherein the second control server became in service after the resource server broadcast the first offer message;
wherein the resource server broadcasts a second offer message after the second control server became in service, wherein the second control server employs the second offer message to determine whether to add the resource server to the second dynamic resource server mapping table to allow the second control server to use the resource server for one or more of the one or more tasks.

12. The apparatus of claim 11, wherein the first offer message advertises a first load capacity, wherein the second offer message advertises a second load capacity that is different than the first load capacity due to an increase or decrease in a load at the resource server between sending the first offer message and sending the second offer message.

13. The apparatus of claim 11, wherein the first offer message advertises an ability to perform a first set of tasks, wherein the second offer message advertises an ability to perform a second set of tasks that is different than the first set of tasks.

14. An apparatus, comprising:
a resource server that broadcasts an offer message over a network that comprises a control server, wherein the offer message announces that the resource service has been added to the network and indicates an availability of the resource server to handle one or more tasks for the control server;
    wherein the offer message invites the control server to selectively and automatically add an indication of the resource server to a dynamic resource server mapping table that comprises indications of a plurality of available resource servers, wherein the dynamic resource server mapping table is employable to determine a selected resource server of the plurality of available resource servers to use for a task of the one or more tasks and wherein the control server evaluates load conditions of the resource server at continuous intervals;
    wherein the resource server comprises a heartbeat timer that indicates a frequency at which to send heartbeat messages to one or more control servers that employ the resource server, wherein the heartbeat messages indicate a continued availability of the resource server to handle the one or more tasks for the one or more control servers that employ the resource server; and
    wherein after successful configuration between the resource server and the control server, the resource server adds an indication of the control server to a dynamic control server mapping table that specifies which control servers to send the heartbeat messages.

15. The apparatus of claim 14, wherein the network comprises a plurality of nodes, wherein the plurality of nodes comprise the control server, one or more other control servers, and one or more other resource servers;
    wherein the resource server broadcasts the offer message over the network without a request from another node in the network to send the offer message.

16. The apparatus of claim 14, wherein the offer message invites the control server to respond with a message of intent to initiate configuration dialog between the resource server and the control server;
    wherein upon receipt of the message of intent from the control server and completion of a successful mutual authentication between the resource server and the control server, the resource server sends one or more configuration parameters to the control server to allow the control server to send a task of the one or more tasks to the resource server.

17. The apparatus of claim 14, wherein the offer message comprises a first offer message, wherein the resource server periodically broadcasts additional offer messages over the network to indicate availability of the resource server to:
one or more additional control servers that were out of service at a time when the first offer message was sent; and/or
one or more control servers that did not respond to the first offer message.

18. The apparatus of claim 17, wherein the resource server comprises a provisionable timer that indicates a frequency for the resource server to periodically broadcast the additional offer messages over the network.

19. The apparatus of claim 14, wherein the resource server comprises a ringback tone server, wherein the offer message indicates one or more characteristics of the ringback tone server and a switching center to which the ringback tone server provides ringback tone service.

20. The apparatus of claim 19 in combination with the control server, wherein the control server comprises a ringback tone call controller, wherein the ringback tone call controller employs the one or more characteristics and the indication of the switching center to determine whether to add the indication of the ringback tone server to the resource server mapping table to allow subsequent use of the ringback tone server for one or more of the one or more tasks.

21. The apparatus of claim 20, wherein the one or more tasks comprise playing a specialized ringback tone to a calling communication device on a call that requires ringback tone service;
- wherein after successful configuration between the ringback tone server and the ringback tone call controller, and selection of the ringback tone server to handle the call, the ringback tone call controller routes the call to the ringback tone server,
- wherein the ringback tone server plays the specialized ringback tone to the calling communication device on the call.

22. A method, comprising the steps of:
- receiving an offer message broadcast over a network by a ringback tone server, wherein the offer message announces that the ringback tone server has been added to the network and indicates an availability of the ringback tone server to play specialized ringback tones to calling communication devices on calls that require ringback tone service; and
- employing information from the offer message to selectively and automatically add an indication of the ringback tone server to a dynamic resource server mapping table that comprises indications of a plurality of available ringback tone servers, wherein the dynamic resource server mapping table is employable to determine a selected ringback tone server of the plurality of available ringback tone servers to handle a call that requires the ringback tone service;
- wherein the offer message indicates one or more characteristics of the ringback tone server and a switching center to which the ringback tone server provides ringback tone service, wherein the dynamic resource server mapping table comprises one or more entries that correspond to one or more respective switching centers, wherein each of the one or more entries comprise indications of one or more ringback tone servers that serve the one or more respective switching centers, wherein the step of employing information from the offer message comprises the steps of:
- adding the indication of the ringback tone server to an entry of the one or more entries that corresponds to the switching center to which the ringback tone server provides ringback tone service; and
- setting in the entry, based on the one or more characteristics, a relative usage preference order between the ringback tone server and one or more other ringback tone servers that serve the switching center.

* * * * *